United States Patent [19]

Thorpe

[11] 3,831,196

[45] Aug. 20, 1974

[54] MAGNETIC TAPE RECORDING METHOD AND APPARATUS

[75] Inventor: Allan Chester Thorpe, Raleigh, N.C.

[73] Assignee: International Business Machines Corporation, Armonk, N.Y.

[22] Filed: Aug. 25, 1972

[21] Appl. No.: 283,883

[52] U.S. Cl. .................................................. 360/52

[51] Int. Cl. .............................................. G11b 5/02

[58] Field of Search...340/174.1 G, 174.1 H, 174.1 A

[56] References Cited

UNITED STATES PATENTS

| | | | |
|---|---|---|---|
| 2,813,259 | 11/1957 | Burkhart | 340/172.5 |
| 3,454,930 | 7/1969 | Schoeneman | 340/174.1 A |
| 3,465,349 | 9/1969 | Schoeneman | 340/174.1 A |
| 3,474,429 | 10/1969 | McCowen et al. | 340/174.1 A |
| 3,577,132 | 5/1971 | Anderson | 340/174.1 A |
| 3,601,808 | 8/1971 | Vlack | 340/172.5 |
| 3,614,757 | 10/1971 | Burr | 340/174.1 A |
| 3,631,427 | 12/1971 | Hein | 340/174.1 A |
| 3,643,228 | 2/1972 | Lipp | 340/172.5 |

*Primary Examiner*—Vincent P. Canney
*Attorney, Agent, or Firm*—E. H. Duffield

[57] ABSTRACT

A reel-to-reel direct tape drive mechanism is disclosed in which the data recorded on the tape is made insensitive to tape velocity variations during read and write operations by converting each coded character to be recorded into a unique bit count which is recorded so that only a counting operation is necessary to read data recorded on the tape.

8 Claims, 3 Drawing Figures

MAGNETIC TAPE RECORDING METHOD AND APPARATUS

FIELD OF THE INVENTION

This invention relates to magnetic media recording apparatus and techniques in general and reel-to-reel direct drive recording apparatus and to encoding methods and techniques in particular.

PRIOR ART

In the field of data handling and communications, and particularly in the field of computer applications, efficient uses or magnetic recording media to store data in the form of encoded bits have been widely developed. In general, a premium in design and development effort has been placed upon increasing the density of data recorded and increasing the speed and accuracy with which the data may be recorded on and read from the media. An inherent problem with all of the prior art approaches is that, as the density of recorded information increases, careful speed control and tape alignment procedures and techniques become mandatory in order to prevent skewing of the tape, misreading of information, or a complete loss of data during a read or write operation due to strictly mechanical fluctuations in speed and tape movement. Very sophisticated tape drive mechanisms have been developed to maintain precise tape velocities and alignments and equally sophisticated start and stop mechanisms have been developed to reduce the lag between start-up of tape and beginning of a read operation. With the advent of modern data processing techniques and machines in commerical and business usage the need for a portable data recording device has become increasingly apparent in such fields as inventory taking, list keeping, and related remotely collected batch type data handling operations. Similarly, the need for an inexpensive, reliable and easily manufactured data input/output device suitable for use in a commercial environment has also been apparent. One of the major drawbacks with the use of prior art systems is their great cost and mechanical and electrical complexity necessitated by the sophisticated drive and sense mechanisms utilized.

OBJECTS OF THE INVENTION

In view of the foregoing shortcomings and limitations inherent in the prior art tape recording methods and apparatus, it is an object of this invention to provide an improved speed insensitive method of recording and reading data on a magnetic media.

It is a further object of this invention to provide an improved data recording apparatus of low cost and high reliability which requires simple and unsophisticated drive mechanisms.

BRIEF DESCRIPTION OF THE DRAWINGS

FIG. 1 illustrates a reel-to-reel tape transport apparatus adapted to drive a cassette holding two reels on which magnetic recording tape is alternately wound and unwound in accordance with the direction of rotation thereof. No tape drive capstan is utilized to drive the tape, rather, the reels are driven directly by shafts 1 and 2 which, in turn, are driven by main drive shaft 3 connected to the motor. Such a drive apparatus may be built using either a frictional drive as illustrated, or gear driven planetary elements. Such mechanisms are well-known in the art as illustrated, for example, by U.S. Pat. No. 3,528,309. A timing disc 18 is schematically illustrated as mounted on motor shaft 3 and may be one of several types including a notched wheel for interrupting a light beam to a photosensor, a toothed magnetic wheel for magnetic reluctance proximity sensing, or a magnetically encoded wheel for magnetic sensing of marks. Motor 4 (in FIG. 2) is a reversible type which may be driven in either direction during the read, rewind, search, backspace, or write operations.

Data in the form of coded characters (for example coded in EBCDIC, ASCII, or BCD) is to have a magnetic representation thereof recorded on and read from the magnetic tape. While a tape cassette apparatus is illustrated, it is obvious that magnetic discs, full size reel-to-reel tapes, or other magnetic media would be equally employable in the current invention.

Figure 1:
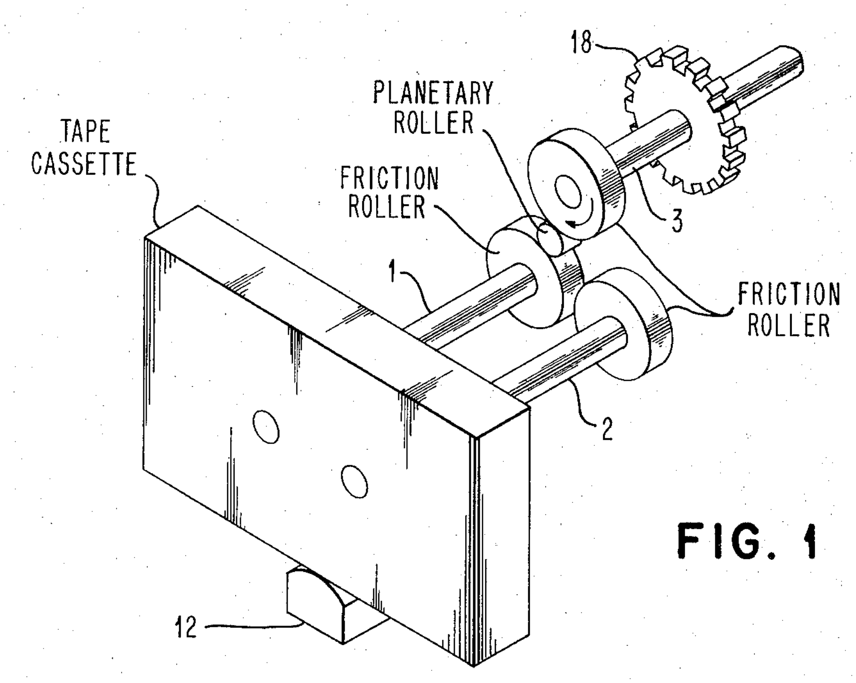
FIG. 1 is an overall view of a reel-to-reel tape cassette drive mechanism.
Figure 2:
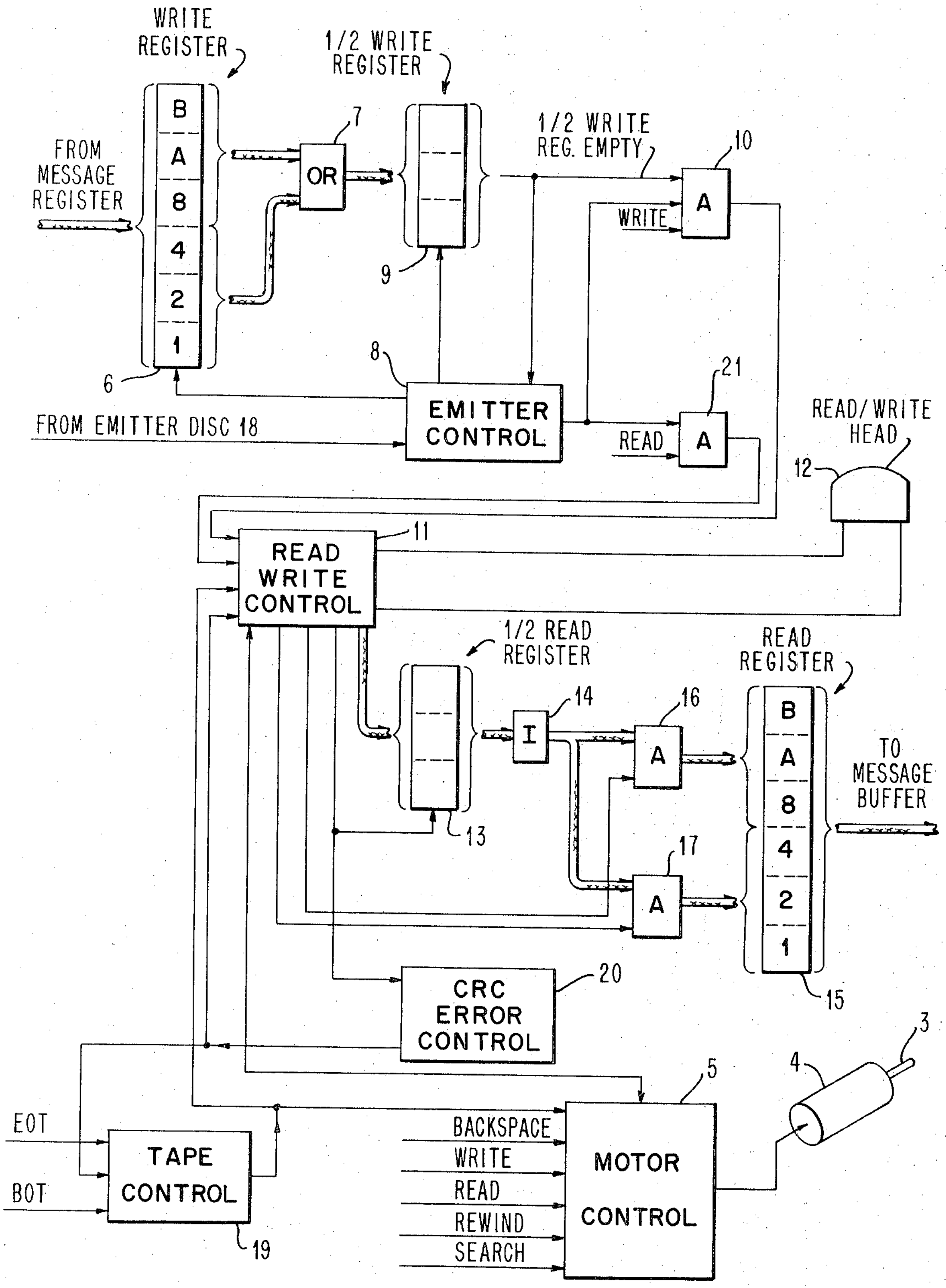
FIG. 2 illustrates, in schematic form, the apparatus of a preferred embodiment of the invention utilizing the recording method of the invention.

The general method of recording and reading data according to the invention is to translate the coded characters for recording on the tape into a bit count, which count is then recorded directly as a number of bits on the media. Turning now to FIG. 2, an example of write and read operations will be given following a brief introduction to the system illustrated. Data to be recorded on the magnetic media is assumed to reside in a record buffer capable of transmitting data characters on demand for recording. The record buffer is not illustrated for the sake of simplicity, but could consist of a multi-stage shift register having storage space for the requisite number of bits to define each character in the specific type of character code utilized in the data system. In FIG. 2, motor 4 is illustrated having output shaft 3 which may be driven in either direction as dictated by the motor control 5. Assuming that a write command is received by motor control 5, motor 4 would be energized to turn in a given direction at an appropriate recording speed. Motor control 5 is for a bi-directional, variable speed motor such as 4. Read and write operations normally occur at the same speed with the tape moving in the same direction. Search mode is a high-speed read operation. Rewind is a reverse high speed operation. Back-space is a normal speed reverse operation over one record so that the record may be checked or re-written. The search mode utilizes high speed forward reading to check for a desired address, or, in this case, a specific sequence of code. Appropriate speed controls and directional mechanisms, such as the mechanism illustrated in FIG. 1, may be used as desired.

A short delay following the giving of a write command and the start of actual data recording is provided by a delay control associated with the write register 6 so that there will be sufficient time for the motor to come up to speed, during which, of course, tape is moving from reel to reel. The read-write control 11 contains the read amplifiers and write circuitry. When in write status the pulses from emitter control 8 energize the write circuit so that the NRZI magnetic pattern is created on tape. When in read status, the flux changes on the tape are converted into suitable signals for use by the digital logic. The read-write control 11 also has a steering or gating function so that the half characters are assembled properly into the read register 15 and also has the logic to recognize end-of-count so that the 1/2 Read register 13 may be emptied.

Tape control 19 recognizes the end-of-tape and beginning-of-tape so that the normal tape indexing function can be controlled. Also, if a read error should occur, the CRC error control, 20, function could cause the tape to backspace over the record for correction purposes. Such tape controls are already well-known in the art, as are CRC (cyclis redundancy check) checking techniques, and hence these are not discussed further since it is obvious to those of skill in the art that any suitable tape control and data checking techniques may be used without prejudice to the present invention.

Emitter control 8 provides the basic timings for the apparatus. It is very similar to an electronic timing control where the reference timing is furnished by an oscillator. The reference timing for the emitter control is furnished by the emitter wheel 18 whose rotational velocity is directly proportional to the tape velocity and the drive motor speed. This system allows wide ranges in tape velocity since the emitter control timing is proportional to tape velocity. Except for this, it is similar in all respects to a purely electronic control and timing function which is well-known in the art for controlling similar type functions.

Assuming that ordinary binary code format is utilized, a single alphanumeric character is placed in write register 6 as illustrated in FIG. 2, from the message buffer. For purposes of description, assume that this code is 101001 (equivalent to a decimal count of 41). This BCD code will then be encoded into a decimal count code in a two-step operation as follows: First, the high order bits (101) are transferred through OR gate 7 by appropriate gating circuitry controlled by a pulse from emitter control 8 which, in turn, is controlled by the emitter wheel 18 attached to shaft 3. The gating of the stages in a particular storage register is well-known in the art and is not illustrated for the sake of clarity. Then, these high order bits are placed in the one half write register 9 at the next pulse from emitter control 8. One-half write register 9 is a binary counter which is incremented once for each ensuing pulse from emitter control 8 and a single one bit is recorded on the tape as each count of this register occurs. The recording and counting continue until one half write register 9 is empty. In the case illustrated, it takes three count pulses to clear register 9 of its content (101), therefore, three successive one bits will be recorded on the tape with each consecutive pulse coming from emitter disc 18 through the emitter control 8 as follows: the initial write command conditions one leg of AND gate 10. The other two legs of AND gate 10 are conditioned by the non-zero state of register 9 and by the presence of an emitter pulse from emitter control 8, and the output from AND gate 10 is fed through the read-write control 11 which pulses the read-write head 12 to record a one-bit on the tape.

Figure 3:
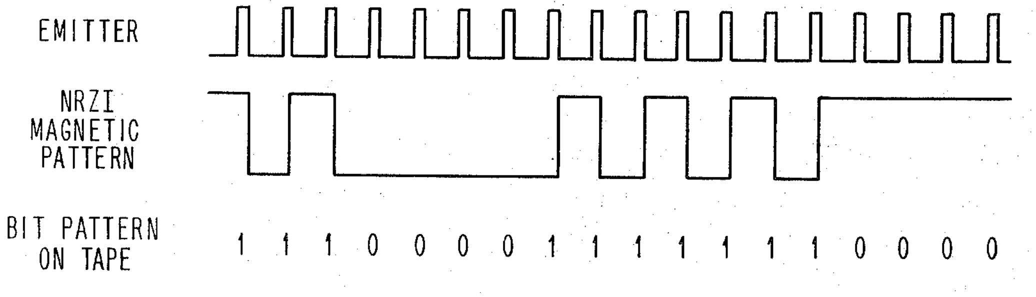
FIG. 3 illustrates an example of recording patterns produced by the method of the invention.

The second step of a write operation consists of transferring the low order bits from register 6 into register 9 and, after an arbitrary number of pulses from emitter control 8 have passed, register 9 is incremented as described above, and additional successive one-bits are recorded as before. FIG. 3 shows in chart form the relationships which exist during the recording of this assumed example. In the top line of FIG. 3, regularly spaced emitter control pulses are illustrated which result from the pickup from the emitter wheel 18. The magnetic pattern of flux transitions encoded on the tape are applied in the well-known non-return to zero (NRZI) recording technique and are illustrated below the emitter pulse configuration in FIG. 3. The bit pattern on the tape is illustrated below the magentic pattern in conjunction with the specific emitter pulses in the assumed example. As illustrated, the last half of the writing operation results in seven one-bit being recorded on the tape since seven count pulses are required to clear register 9 of a 001 content of binary code. The intervening zero bits between the first and second half of the write operation have no significance in the bit pattern illustrated, and serve only as a data separation function for a read operation to be described below. This procedure continues until the contents for the write register 6 are completely written and the write register is empty. A longer sequence of zero bits would be inserted at end of the record for record separation. In the event that a code to be written happens to contain 000 when it is loaded into one-half write register 9, eight one-bits will be written. This is done, for example, by emitter control 8 incrementing one-half write register 9 once and then checking for an "empty" condition, thereby overcoming the problem of an initial write load containing all zero-bits. If emitter control 8 is built to check for the "empty" condition of one-half write register 9 only after incrementing it at least once, and after every increment thereafter, no difficulty exists.

An example of a read operation will now be given. First, the tape is moved back to its starting point by reversing motor 4 and driving the tape backwards until a BOT (beginning of tape) indicator is reached and sensed by tape control 19 as is well-known in tape indexing arts. Upon sensing the BOT indicator, motor 4 is stopped and a read command is applied to motor control 5 which starts motor 4 turning in the opposite direction from the rewind. Again, an appropriate delay is included to allow the drive motor 4 to come up to speed. AND gate 21 is also conditioned by the read command as illustrated. The first one bit detected by read head 12 is amplified and shaped by the read-write control 11 and entered into the one-half read register 13, which is first set to an "all ones" condition at the start of any read operation, and this first one bit will clear register 13 to an "all zero" condition. The next one bit read will result in a 001 content of register 13. If the first data on the tape was 1110000111111110000 as described previously, the third one bit would cause register 13 to go to a 010 status binary since these pulses are entered into register 13 as a binary count. During the reading of these first three successive one bits, emitter control 8 is interrogated by the read-write control 11 to see how many emitter pulses go by between the one bits which are read from the tape. In an ideal system, there would be a one-for-one correspondence between one bits and emitter pulses, but in the actual system, zero, one, or two emitter pulses may go by between one bits as they are read. This is caused by eccentricities in the drive mechanism, slipping and tape stretch. Arbitrarily, it is assumed that if at least three emitter pulses are detected between tape one- bits which are read, then the end of a count has been reached. These numbers for assumptions are completely arbitrary and may be changed at the option of the designer and are only used for illustration purposes; for example, ten zero bits could be recorded for data separation and five zero bits could be recognized as the end of a count. In the present case, end of count is recognized after 111 is read from tape because of the detection of at least three zero bits between one bits. 010 would result in register 13. The contents of register 13 are inverted by inverter 14 and stored in the high order half of read register 15 as dictated by the read-write control 11 conditioning the appropriate AND gate 16. 010 will appear then, in read register 15 and 101. Register 13 is again set to all one bits (111) and reading continues. Similarly, seven successive single bits will be counted into the read register 13, the first bit clearing it to zero, and its status will be 110. This count will, in turn, be inverted and placed in the lower half of read register 15 through AND gate 17 as 001 in its inverted state. The contents of read register 15 will now be 101001, the original binary code assumed in the example. The content of read register 15 can then be placed in the message buffer (not illustrated) one byte at a time for use by the using system. In the example just described, one-half write and one-half read steps were utilized to conserve the amount of recording tape used. A single full write or full read step would be entirely compatible with the novel method set forth, but, if a typical 64-character code set of data characters were used, it would require 64 counts (or one bits) to record the worst case of (000000). This would result in 64 one-bits or pulses recorded on the tape and, on the average, it would require 36.5 bit spaces on the tape to record the average character code count, assuming equal usage distribution of characters in the data stream. This figure is derived figuring 64 one bits for recording 000000 plus four zero bit spaces for separation of the character, one one-bit for the best possible case of 111111, and four more zero bits for separation of that character for a total of 73 bit spaces, divided by two to find the average, which is 36.5.

By using a two-step operation with one-half write and one-half read steps, the worst case 000000 requires only 24 bit spaces (eight one bits written twice plus four separating zero bits written twice). The lest number of bit spaces in this case would be a single one-bit plus four separating zero bits written twice for the code 111111. The average number of bit spaces in this method would be 17, assuming equal usage of characters and an arbitrary four zero bits for separation of characters. Alternative numbers of steps are arbitrarily choosable. For example, three one-third write or one-third read steps could be used, requiring an average of 19.5 bit spaces per character, figured using the method above. Other similar fractional read and write options are choosable at will, but, for six-bit binary codes and the assumed character spacing of four zero bits, the optimum exists at one-half read and one-half write steps operation as illustrated.

It will be easily appreciated that the system and method described are completely insensitive to velocity variations in the drive system for the tape transport since it is only required to sense the presence of a one bit somewhere on the tape in order to count it. Conversely, of course, this method utilizes a good deal of space on the tape and does not place a premium on high density recording. This, however, is not the object of the present invention since adequate storage space exists on 200 feet of tape which may be wound in a typical tape cassette, such as that produced commercially by the Phillips Co., to allow for the recording of up to 65,000 binary characters which is sufficient for many commercial applications. This assumes a record length of 100 characters and the use of a single track head. A double track head system would yield over 100,000 binary characters.

While the invention has been particularly shown and described with reference to a preferred embodiment thereof, it will be understood by those skilled in the art that various changes in form and details may be made therein without departing from the spirit and scope of the invention.

What is claimed is:

1. A method of recording multi-bit coded data characters on magnetic media, comprising the steps of:
converting each said multi-bit coded data character into a unique number of pulses, said number being representative of said data character; and
serially recording magnetic representations of said number of pulses on said magnetic media.

2. A magnetic media data storage and retrieval method for handling multi-bit coded data characters, comprising the steps of:
converting each said multi-bit coded data character into a unique number of signal pulses, said number being representative of said data character;
serially recording magnetic representations of said number of signal pulses sequentially on a magnetic medium;
retrieving data from said magnetic medium by sensing said recorded signal pulses, counting said pulses sensed; and
reconverting said count of said sensed pulses into a character in a coded data format.

3. The method of claim 2, wherein:
said converting and said reconverting steps are each performed separately for both the lower and higher order portions of said coded data characters formatted in multi-bit coding schemes.

4. Apparatus for magnetically recording data as a number of pulses, comprising:
receiving and temporary storage means for holding a coded data character to be recorded;
conversion means for converting said coded data character into a unique number of pulses, said number being representative of said data character; and
recording means for placing said pulses on a magnetic record media.

5. Apparatus as described in claim 4, further comprising:
sensing means for sensing the presence of said recorded pulses on said magnetic media;
reconverting means connected to said sensing means for recoverting said pulses into coded data characters.

6. Apparatus as described in claim 5, wherein:
said conversion means comprises a binary counter for holding said data for conversion and a source of stepping pulses for stepping said counter to zero;
said recording means comprises a magnetic recording head and control circuitry therefore which is responsive to said conversion means to record one pulse on said magnetic media for each stepping of said counter; and said reconverting means comprises a binary counter connected to said sensing means for counting the number of said pulses sensed and an inverter means for inverting said count when said pulses have been counted.

7. A method of recording multi-bit coded data characters on magnetic media, as described in claim 1, wherein:

said converting and recording steps are performed simultaneously.

8. A magnetic media storage and retrieval method as described in claim 2, wherein:

said converting and recording steps are performed simultaneously and said reconverting and counting steps are performed simultaneously.

* * * * *